Aug. 9, 1966

E. L. ALEXANDER ETAL  3,265,138
MAGAZINE FOR STORING AND HANDLING DRILL
PIPE IN ROTARY DRILLING RIG

Filed Aug. 19, 1963

INVENTORS
Emmett L. Alexander
and Herschel L. Bules.
BY Paul E. Mullendore
ATTORNEY

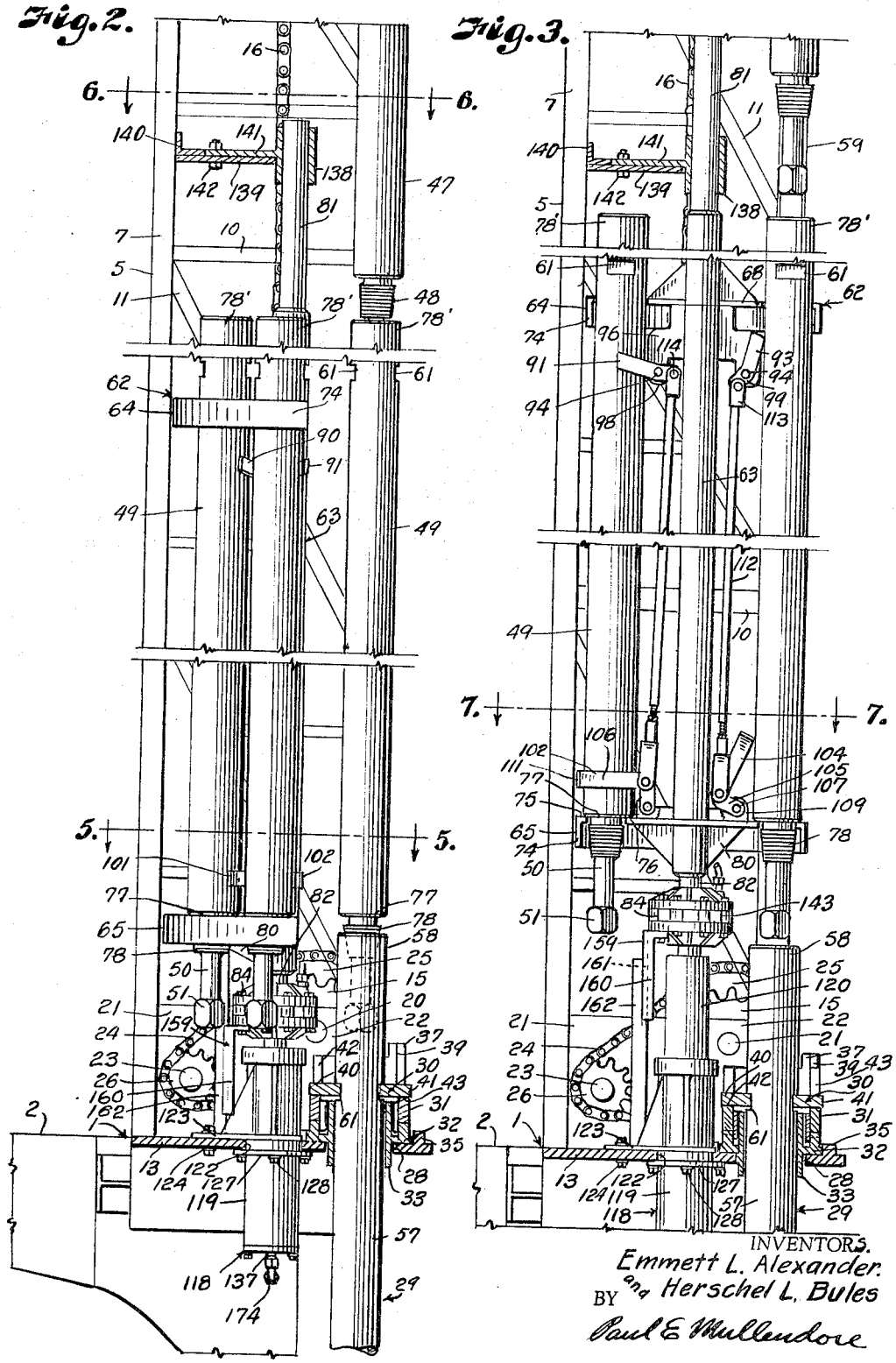

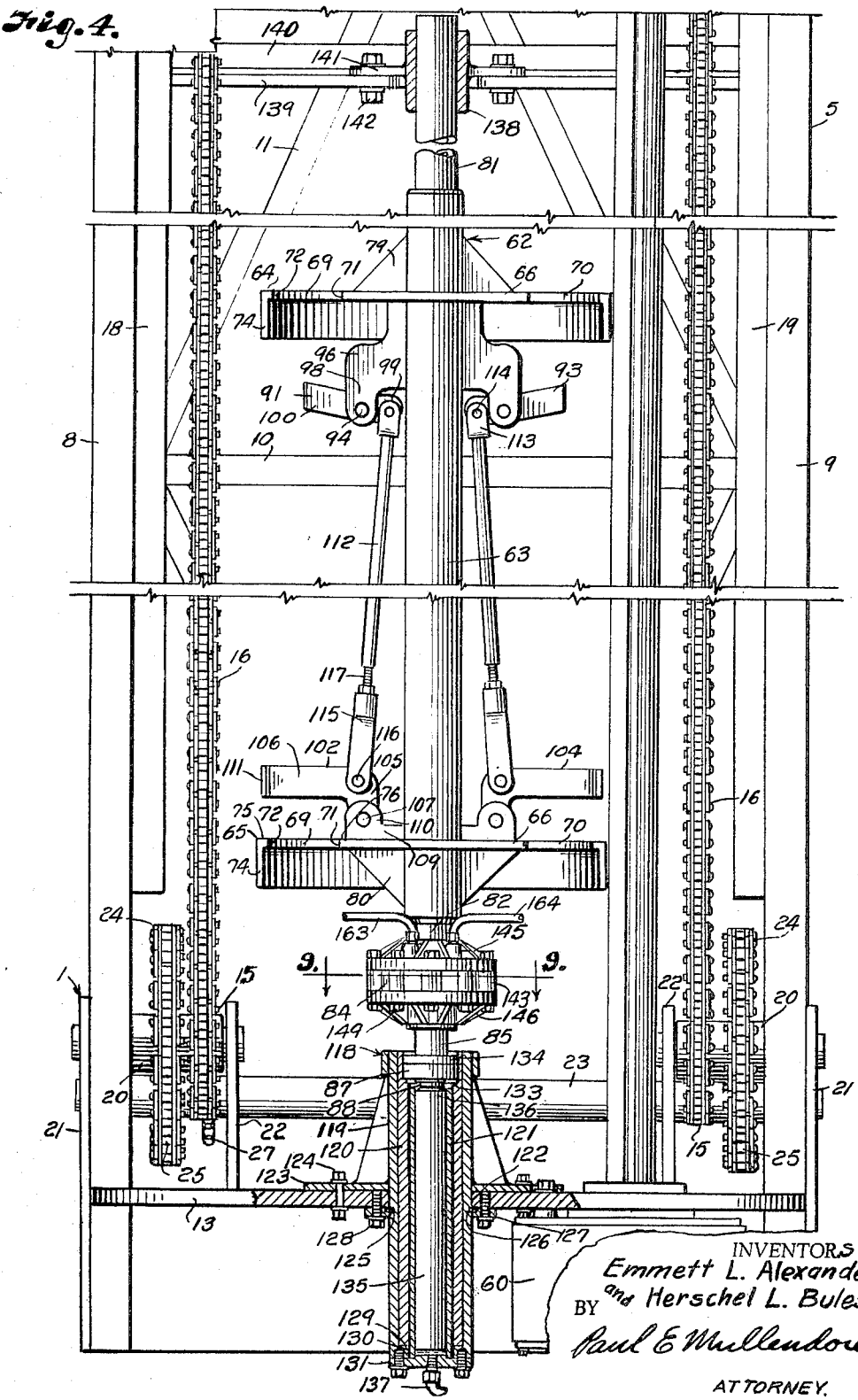

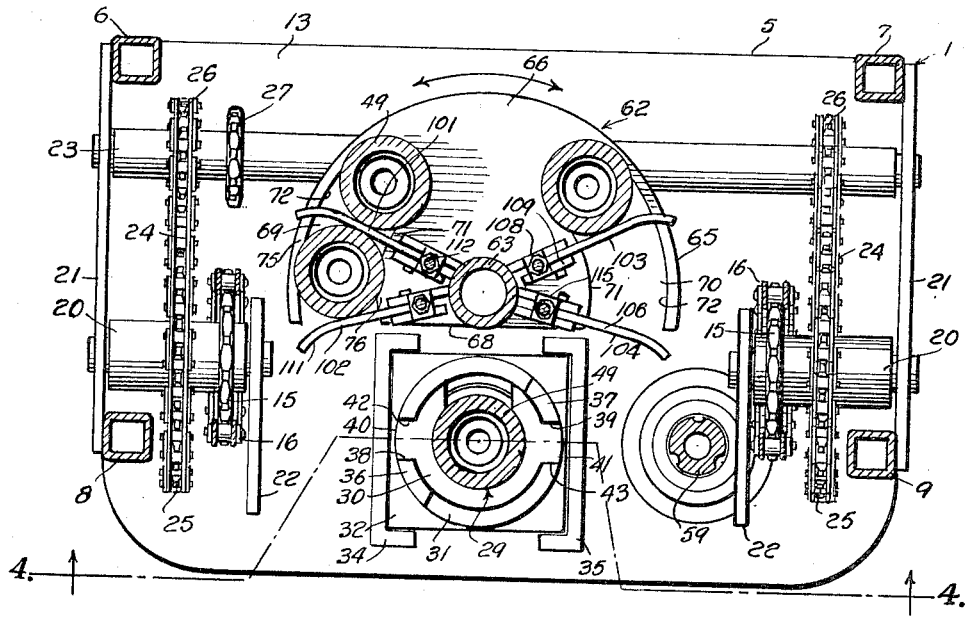

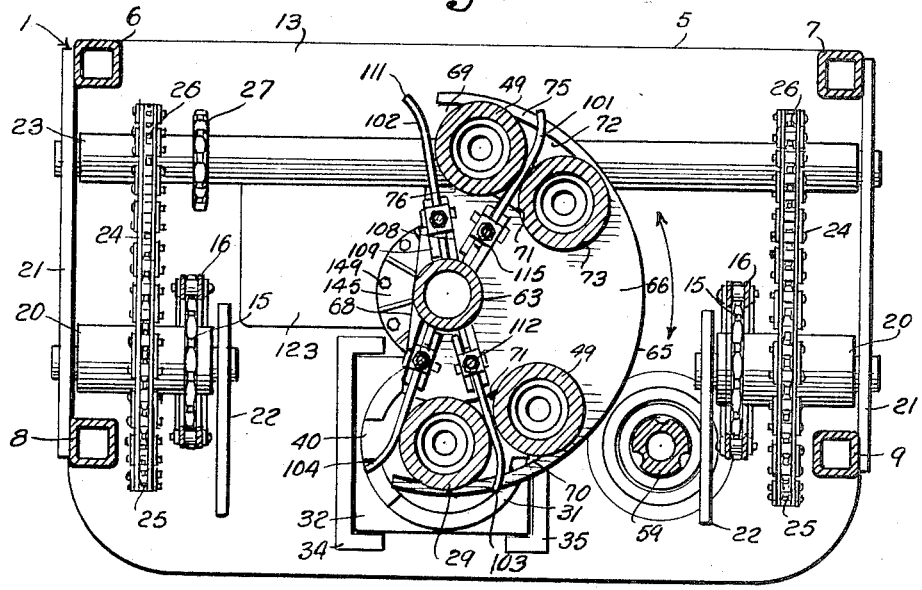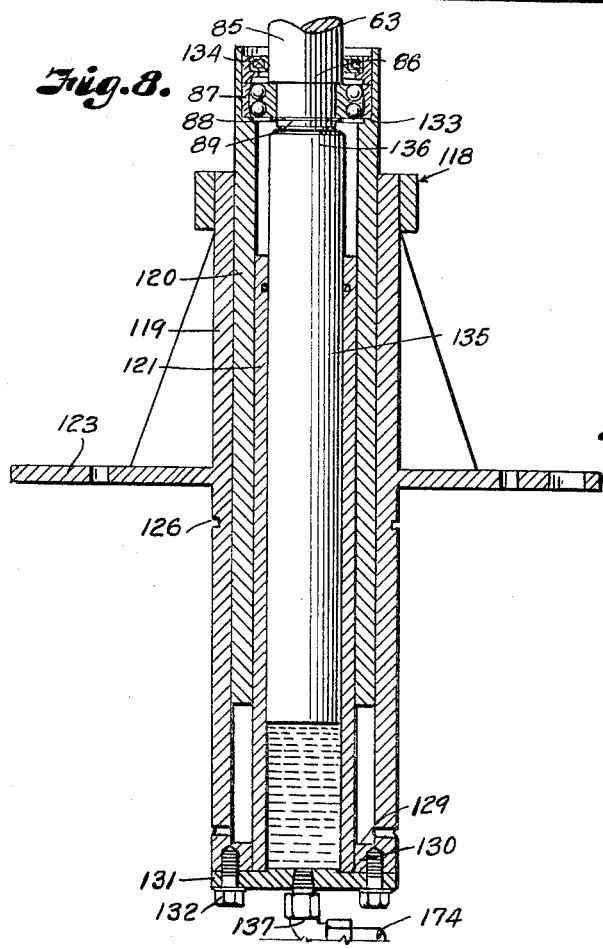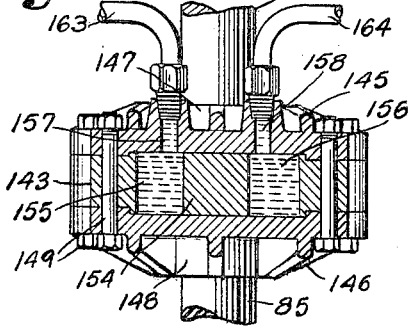

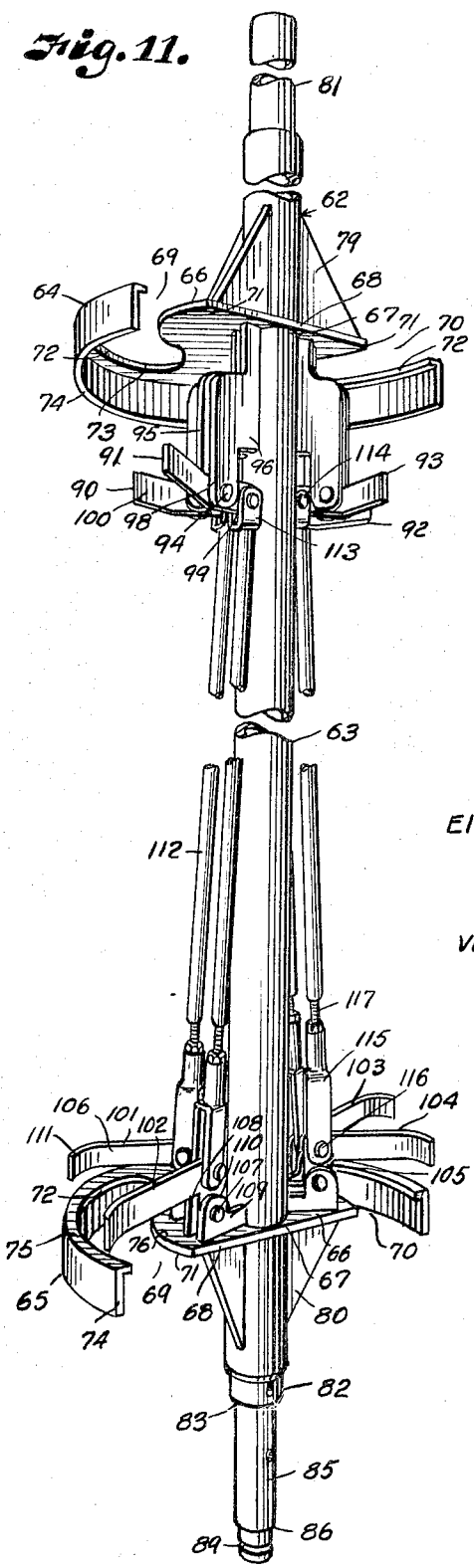

United States Patent Office 3,265,138
Patented August 9, 1966

1

3,265,138
MAGAZINE FOR STORING AND HANDLING
DRILL PIPE IN ROTARY DRILLING RIG
Emmett L. Alexander and Herschel L. Bules, Enid, Okla.,
assignors to George E. Failing Company, Enid, Okla.,
a corporation of Delaware
Filed Aug. 19, 1963, Ser. No. 302,871
15 Claims. (Cl. 175—52)

This invention relates to rotary drilling apparatus, and more particularly to a magazine therefor for storing and handling drill pipe.

Rotary drilling apparatus includes a mast associated with a rotary mechanism for rotating a drill bit through a drill pipe to which additional drill pipe sections are added as the hole deepens. Consequently, mechanism must be provided for storing and handling the additional drill pipe sections and for moving them from storage into a position for connection with the drill pipe, and for returning them to storage when the hole is completed or the bit is to be removed from the bore hole to change bits or for other operations incidental to drilling.

In rotary apparatus for drilling angular holes, a technique known as angle face drilling in strip and open pit mining operations, the mast must be tilted at any angle from vertical to as much as 30° off vertical. Consequently, the customary methods and apparatus for storing and handling the drill pipe sections is not practical, and various pipe handling mechanisms have been devised for attachment to the mast in such a manner that the handling apparatus tilts with the mast and swings from a storage position outside and laterally of the mast to carry the drill pipe sections through the open face of the mast and into parallel alignment with the drilling axis. Thus when the mast is tilted, the drill pipe section to be connected into the drilling string is actually suspended above the inclined axis when connected or disconnected from the drilling string in the bore hole. It is obvious that in making such connections, the swing joints of the handling mechanism must be held to very close tolerances, in order that the connections on the drill pipe sections can be aligned easily with the connections of the drilling string. Therefore, the swinging mountings are expensive and costly to construct. Furthermore, they are, of necessity, of heavy construction, which requires reinforcement and weight in the derrick structure necessary to support the leverage forces produced by the storage mechanism. Moreover, complicated indexing mechanisms and powers are required to be carried by the swing arms in order to turn the storage mechanism and bring a drill pipe section into axial alignment with the axis of the drilling string.

The above objections are also true even when drilling vertical holes, because of the swinging support of the pipe handling mechanism on the corner of the mast. Such mounting of the pipe handling and storage mechanism is bulky and interferes with portability of a portable drilling rig.

The principal object of the present invention is to eliminate the above objections by providing simple arrangement wherein the drill pipe sections are stored directly within the mast in a magazine that oscillates on a single axis fixed relatively to the mast, and wherein the drill pipe sections are each in a position to be registered with the axis of the drilling string simply through turning of the magazine on its fixed axis. Thus, when drilling angular holes, the drill pipe sections are cradled within the magazine, so that connections thereon are in registry with the connections of the drilling string, with the result that the joints slip readily together to be easily made up and broken out, depending upon whether the drilling string is being run into the hole or being pulled therefrom.

2

It is also an object of the present invention to provide a magazine that is movable longitudinally of its fixed axis, to lift and lower a drill pipe section in order to remove or slide the threaded pin end thereof into and out of the box at the upper end of the drilling string, thereby adapting the invention to the type of drill pipe sections illustrated and described in copending application Serial No. 283,429, filed May 27, 1963.

Other objects of the invention are to provide a magazine for storing and handling drill pipe sections that is at all times compactly contained with the mast of a drilling rig, yet is out of the way of the pull down chains, rotating head and hoisting tackle, and which needs no repositioning thereof when the mast is moved to a reclining transport position; and to provide a magazine with a simple oscillating mechanism that shifts with the elevator mechanism and which freely oscillates the magazine without interference by the elevator mechanism.

Other objects of the invention are to provide a simple, strong and light weight magazine that is securely rotatable in the mast and free from sagging under load of the drill pipe and particularly when drilling a slanting hole; and to provide a magazine that is in the form of a segment to accommodate the drilling string in one position and to provide entrances to the drill pipe seats at the right and left sides of the magazine and wherein the drill pipe is carried to swing in arcuate paths into axial registry with the drilling string.

In accomplishing the above and other objects of the invention as hereinafter pointed out, improved structure has been provided, the preferred form of which is illustrated in the accompanying drawings, wherein:

FIG. 1 is a side view of the rear portion of a rotary drilling rig, showing the lower portion of the mast when in drilling position, and which is equipped with a drill pipe storing and handling magazine embodying the features of the present invention, and showing the drill stem supported in the bore hole, with the spud on the driving head disconnected therefrom and the head moving upwardly within the mast preparatory to insertion of a drill pipe section from the storage and handling mechanism.

FIG. 1-A shows the upward continuation of the mast and the upper end of the magazine carried therein.

FIG. 2 is a view similar to FIG. 1, but showing both the upper and lower ends of the magazine, and illustrating a drill pipe section disconnected from the drilling string, as when pulling the drilling string, and with the magazine in its initial position ready to move into position for engaging the disconnected drill pipe section.

FIG. 3 is a similar view showing the magazine after it has picked up the drill pipe section and in raised position to remove the pin end thereof from the box end of the drill pipe section which remains in the bore hole.

FIG. 4 is an enlarged elevational view of the open side of the mast, showing the mounting of the magazine and illustrating the upper bearing bracket and the elevator in section.

FIG. 5 is an enlarged horizontal section on the line 5—5 of FIG. 2.

FIG. 6 is an enlarged horizontal section taken on the line 6—6 of FIG. 2.

FIG. 7 is a horizontal section taken on the line 7—7 of FIG. 3.

FIG. 8 is an enlarged vertical section through the elevator that raises and lowers the magazine.

FIG. 9 is a horizontal section through the oscillator for the magazine, the section being taken on the line 9—9 of FIG. 4.

FIG. 10 is a vertical section through the oscillator, taken on the line 10—10 of FIG. 9 and particularly illustrating the ports for inlet and outlet of the actuating fluid.

FIG. 11 is an enlarged perspective view of the magazine prior to installation in the mast, for better illustrating construction thereof.

FIG. 12 is a diagrammatic view of the pressure fluid system for actuating the oscillator and elevator mechanisms of the magazine.

Figure 1:
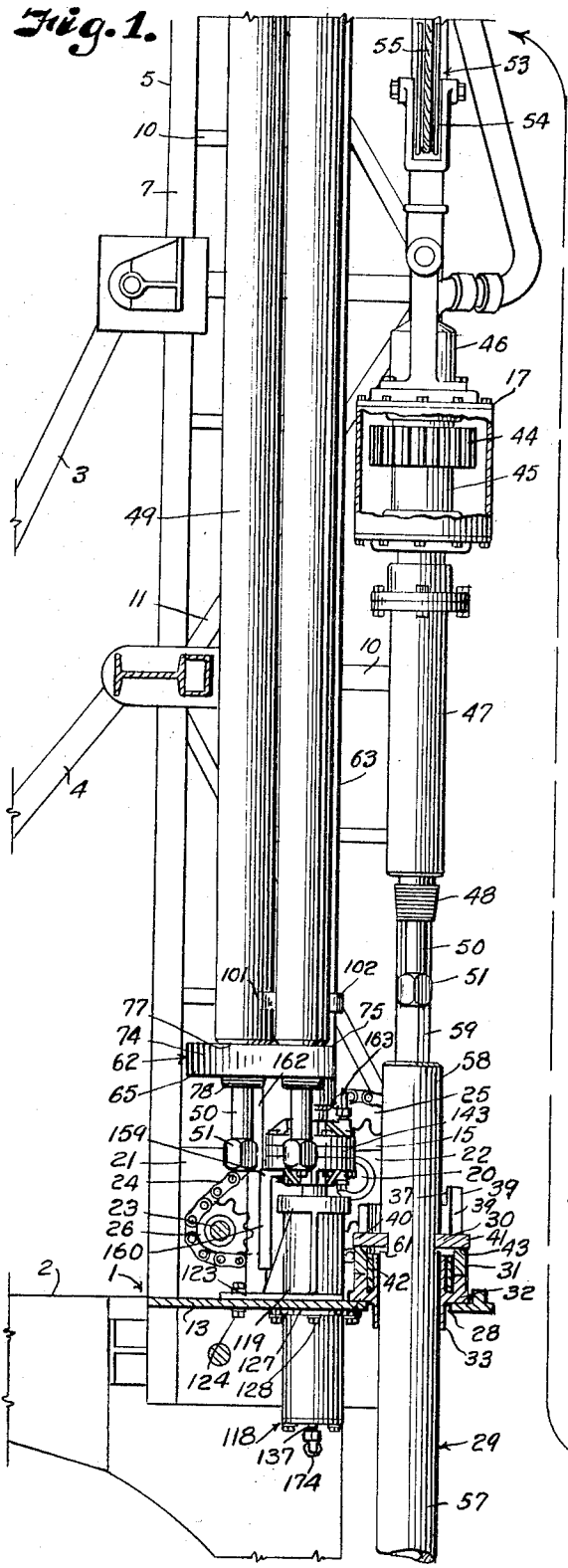
Figure 1:
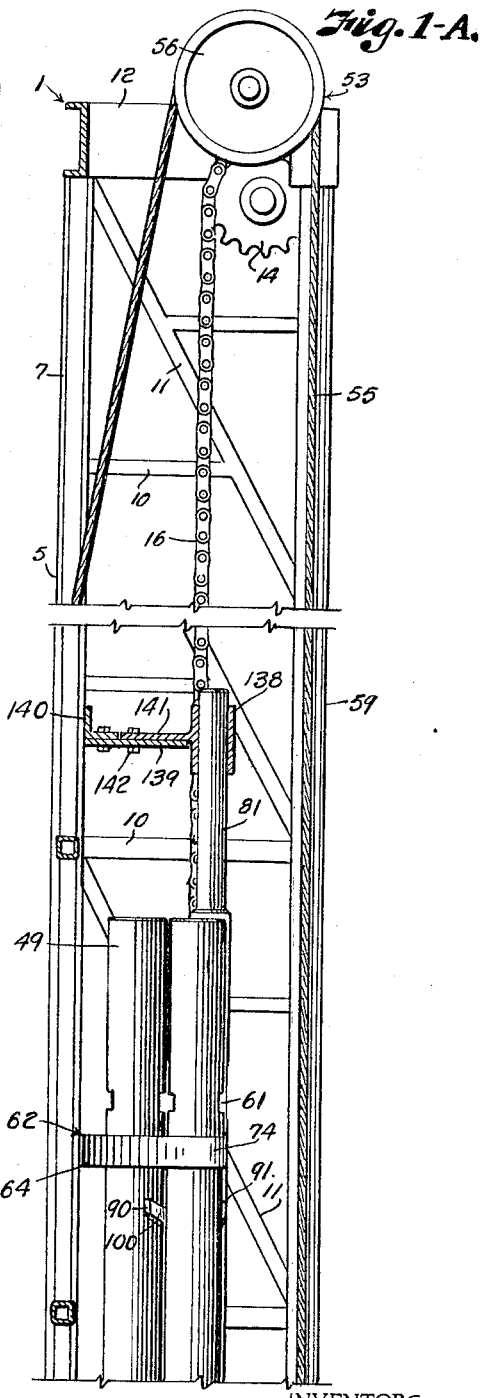

Referring more in detail to the drawings:

1 designates a drilling rig embodying the present invention for storing and handling drill pipe sections when drilling bore holes into ground formations for any purpose. The particular rig illustrated in the drawings is especially adapted for angle faced drilling in strip and open pit mining operations and other drilling where slanting holes are required, however, it is to be understood that the invention is well adapted for use in other type drilling rigs.

The rig 1 includes a machinery deck 2 that is suitably supported for mobile use, either on wheels or crawlers (not shown). Pivotally carried on the deck 2, as, for example, by pressure actuated devices 3 and telescoping braces 4 such as disclosed in copending application Serial No. 242,662, filed December 6, 1962, is a mast 5. By manipulating the pressure actuated devices 3 (FIG. 1), the mast may be moved on the braces 4 from a horizontal carrying position above the machinery deck 2 to a vertical position shown in the present drawings, or by adjusting the braces 4 to an intermediate position inclined from the vertical position shown, as when angle faced drilling in strip or open pit mining or similar drilling.

The mast 5 includes corner legs 6, 7, 8 and 9. The legs 6 and 7 are connected together, and the legs 8 and 9 are connected to the legs 6 and 7 by girths 10 and braces 11, as in usual mast construction. Carried on the upper ends of the legs is a crown block 12 (FIG. 1-A), and carried by the lower ends of the legs is a floor deck 13.

The rig illustrated being of the chain pull down type, the crown block 12 carries sprockets 14 (FIG. 1-A) at the opposite sides thereof, which cooperate with similar sprockets 15 at the base of the mast to carry endless chains 16 by which a traveling head 17 (FIG. 1) is moved up and down guide tracks 18 and 19 that are attached to the inner faces of the legs 8 and 9, as shown in FIGS. 4 and 6. The lower sprockets 15 are carrier on shafts 20 which have their outer ends journaled in plates 21 connecting the legs of the mast at the sides of the floor 13. The inner ends of the shafts are journaled in plates 22 that are carried on the floor deck 13 at points spaced from the inner faces of the legs 8 and 9 and from each other to provide working space therebetween for manipulating the drilling string and accommodating the present invention, as later to be described.

The shafts 20 are driven from a countershaft 23, also having its ends journaled in the outer plates 21 at points spaced forwardly from the legs 6 and 7. The countershaft 23 is connected with the shafts 20 by endless chains 24 operating over driving sprockets 25 and driven sprockets 26 on the respective shafts. The countershaft is driven by a sprocket 27 (FIG. 7) which is suitably connected in driving relation with an actuator, not shown.

Provided in the floor deck 13 at a place between the inner bracket plates 22 and in direct lateral alignment with the guide tracks 18 and 19 for the traveling head 17 is an opening 28, to pass the drilling string 29 therethrough. The drilling string is supported when drilling by the traveling head 17 and when running in or pulling the drill pipe sections by a fork 30 that is placed on the seat of a ratchet collar 31 carried upon a plate 32 overlying the opening 28, and which also carries a sleeve 33 (FIGS. 1, 2 and 3) to pass the drilling string 29 therethrough. The plate 32 is retained from rotation by means of ribs 34 and 35 on the floor of the mast.

The ratchet collar 31 illustrated in the drawings is described in detail in copending application Serial No. 283,429, filed May 27, 1963. Briefly, the collar 31 has diametrically opposed lugs 36 and 37, provided with faces 38 and 39 on the anticlockwise sides thereof for engaging arms 40 and 41 of the fork 30 and which faces 38 and 39 register with downwardly extending slots 42 and 43 in the ratchet collar, all of which is explained in detail in the application Serial No. 283,429.

Rotatably mounted in the traveling head 17 and driven by a gear 44 is a tubular spindle 45 that is connected at its upper end with a swivel 46 through which the pressure drilling fluid is supplied as in usual practice. The lower end of the tubular spindle 45 projects downwardly from the traveling head and is connected with a tubular spud 47 having on its lower end a threaded pin 48 conforming with the threaded pins of the drill pipe sections 49 which compose the drilling string 29.

As disclosed in application Serial No. 283,429, the pin 48 of the spud and pins of the drill pipe sections each have a neck 50 that extends downwardly from the threaded pin 48 and terminates in a driving lug 51 for engaging sockets 52 (FIG. 6) within the upper end of the drill pipe sections 49 when screwing up or unscrewing the connections. The operations of pulling or running in the drilling pipe are described in detail in said application Serial No. 283,429. Briefly, when pulling or running in the drill pipe, the traveling head is raised and lowered at a high speed by a tackle mechanism 53 (FIGS. 1 and 1-A), which includes a pulley 54 attached to the swivel head 46 to connect the loop of a hoisting cable 55 that runs over crown pulleys 56 carried by the crown block 12, and downwardly therefrom to a winding drum (not shown) that is carried upon the machinery deck 2.

In drilling a bore hole, the drill bit (not shown) is attached to the lower end of a first drill pipe section 57, with the box 58 at the upper portion of the drill pipe section connected with the spud 47. The drill pipe section is lowered through the ratchet collar 31 upon lowering of the traveling head 17 in the mast.

Hole is made by rotating the spindle 45 through the gear 44, that in turn is driven by a chain of gears (not shown) and connected with a gear (also not shown) having a sliding driving connection with a drive rod 59. The drive rod 59 extends vertically within the mast and is driven from a gear unit carried in the housing 60 that is attached to the under side of the floor 13 (see FIG. 4). The spindle 45 is thus rotated while downward pressure is applied through the chains 16 to rotate the bit in making hole in the formation to be drilled.

When the drilling has progressed to the point where the upper end of the first drill pipe section approaches the ratchet collar 31, downward feed by the chains 16 is suspended and the cable 55 now supports the drill pipe. The fork 30 is applied to the upper end of the drill pipe by slipping the fork into notches 61 that are provided in the sides of the drill pipe section 57, to seat upon the ratchet collar (FIGS. 1, 2 and 3). The spud 47 is then rotated in the opposite direction by means of the drive of the traveling head, to unscrew the threaded pin 48 of the spud 47 from the upper end of the first drill pipe section 57 and to withdraw the lug 51. The spud 47 is connected with a second drill pipe section which is elevated by means of the cable 55 into position where the threaded pin 48 on the lower end thereof axially registers with the threaded box 58 on the first drill pipe section. The drilling progresses until a third drill pipe section must be connected into the drilling string. Additional sections of drill pipe will be added as needed until the hole reaches the desired depth, whereupon the drill pipe sections are disconnected by reversing the procedure.

The structure thus far described, in itself, forms no part of the present invention, since, as above stated, the present invention pertains to an improved means for storing and handling the drill pipe sections to facilitate manipulation thereof when connecting and disconnecting the joints, it being desirable to describe a type of rig in order to set up the preferred embodiment of the invention therein and to illustrate and describe the combination and operation thereof with a drilling rig.

In accordance with the present invention, the drill pipe sections are stored in a magazine 62 that is mounted entirely within the mast 5 and oscillates on its own fixed axis to carry the drill pipe sections into and away from the extended axis of the drilling opening 28 in the floor 13 of the mast.

While the magazine 62 appears in all the principal figures of the drawings, the construction thereof is best understandable in FIG. 11. FIG. 11 shows the magazine as including a vertical shaft 63, preferably tubular and of a length substantially corresponding to the length of the drill pipe sections. Carried on the shaft 63 are upper and lower pipe holding devices 64 and 65. The pipe holding devices each have a disk portion 66 that is in the form of a semicircular segment, with its circular side extending around the shaft 63 slightly more than 180°, to accommodate, in the axis of curvature, an opening 67 for passing the shaft 63 therethrough. The front transverse edges 68 of the segment portions are, therefore, substantially tangent to the shaft, as illustrated in FIGS. 5, 6 and 7. In the disk portion of the upper pipe holding device and opening through the front edges 68 are arcuate slots 69 and 70 at the respective sides of the shaft. The slots 69 and 70 have a width substantially conforming to the outside diameter of the drill pipe sections, so that the upper ends of the drill pipe sections may pass into the open ends of the slots and with the opposite diametrical sides thereof closely contained between the inner and outer arcuate edges 71 and 72 of the slots. The slots terminate with their inner ends in arcuate seats 73 for engaging the innermost drill pipe sections to be carried in the magazine, as later described. The outer peripheries of the circular sides of the disk portions are reinforced on the outer sides of the slots by depending flanges 74 that terminate at the front transverse edge 68.

The arcuate slots in the lower pipe holding device 65 are of less width than the slots in the upper pipe holding device, so that the marginal edges 75 and 76 on the upper face thereof are adapted to seat shoulders 77 on the drill pipe sections that encircle the threaded pins 78 on the lower ends of the drill pipe section. The slots, however, are sufficiently wide to provide a fit with the portions of the pin that join with the shoulders 77.

The upper holding device is fixed to the shaft at a point spaced from the upper end thereof, preferably by welding, and strengthened by triangular shaped gussets 79 that are welded to the upper face of the disk portion of the upper pipe holding device 64 and to the shaft, as best shown in FIG. 11. The lower pipe holding device is similarly secured to the lower end of the shaft and reinforced by similar gussets 80, welded to the under side face of the disk portion and to the shaft, also as best shown in FIG. 11. In securing the disk portions to the shaft, care is taken that the front transverse edges 68 of both the upper and lower pipe holding devices are in alignment with each other.

Extending from the upper end of the tubular shaft 63 is a trunnion 81, having a length to accommodate a vertical movement of the shaft, as later described. Extending from the lower end of the shaft 63 is a similar trunnion 82 having an annular shoulder 83 below the end of the shaft, to provide an abutment for mounting an oscillator 84 on the reduced portion 85 of the trunnion. The reduced portion of the trunnion extends through the oscillator and has a shoulder 86 for seating a thrust bearing 87, the thrust bearing being retained on the terminal end of the trunnion by a lock ring 88 which fits in a groove 89 (see FIG. 8).

The slots 69 and 70 of the pipe holding devices 64 and 65 in the present drawings are each of a length to accommodate two drill pipe sections therein.

In order to retain the drill pipes in the slots, the magazine is equipped with a latch mechanism. The latch mechanism consists of upper pivoted arms 90, 91, 92 and 93, each of which is mounted on a cross pin 94, carried between pairs of bracket plates 95 and 96. The bracket plates are all of similar construction and are welded to the shaft 63 directly below the disk portion of the upper holding device 64. The plates 95 and 96 have depending ears 98 to carry the cross pins 94 and to space the pins from the shaft to accommodate swinging movement of the inner ends 99 of the arms. The outer ends 100 of the arms project in an outward and slightly upward direction, to engage sides of the drill pipe sections opposite to the rounded ends of the slots. The arms are so positioned around the shaft that the arms 90 and 92 engage between the drill pipe sections, and the arms 91 and 93 engage the outer faces of the last drill pipe sections to be inserted into the magazine, so as to prevent displacement of the outermost drill pipe sections through the open ends of the arcuate slots.

The lower latch arms consist of bell crank levers 101, 102, 103 and 104, having short arms 105 extending parallel with the shaft of the magazine, and longer outwardly directed arms 106, which are positioned radially of the shaft in accordance with the position of the upper latch arms. The short ends of the bell crank levers are pivotally mounted on cross pins 107, which have their ends carried between pairs of brackets 108 and 109 that are welded to the disk portion of the lower holding device. The brackets have upwardly directed ears 110, to carry the cross pins 107, and which are also spaced from the shaft to allow rearward pivotal movement of the levers. The outer ends of the lower arms curve outwardly to provide handles 111 by which the levers may be pivoted into and out of latching position. The inner arm portions 99 of the upper latch arms are connected with the bell crank levers by links 112. The upper ends of the links have yokes 113, carrying cross pins 114 extending through the tail portions of the latch arms. The lower ends of the links connect with the bell crank levers through clevises 115 by pins 116. The clevises 115 are adjustably connected with threaded lower ends 117 of the links, as shown in FIG. 11.

The magazine thus described is oscillatably supported within the space in the mast to the rear of the drilling string. The lower trunnion 82 is journaled in the thrust bearing 87, which in turn is carried by an elevating mechanism 118, which is carried by the floor 13. The elevating mechanism is to lift the magazine to move the pin ends of the drill pipe sections out of the box of the uppermost drill pipe section which remains in the bore hole.

The elevating mechanism is best illustrated in FIG. 8 and includes an outer cylinder 119 which forms a guide for an inner cylinder 120, which, in turn, is reciprocable upon an inner sleeve 121. The outer cylinder is supported in desired position relatively to the drilling string by the floor 13 of the mast, with the lower portion of the cylinder depending through an opening 122 in the floor. The opening 122 is arranged so that the center thereof is spaced from the center of the drilling opening 28, previously described, a distance corresponding to the distance that the center lines of the arcuate slots 69 and 70 are spaced from the axis of the magazine shaft 63, whereby when the magazine is oscillated, as later described, the center of one or the other of the slots 69 or 70 moves transversely across the axis of the bore hole to pick up a section of drill pipe, or deposit a section of drill pipe in the axial center of the bore hole, as later to be described.

In order to support the outer cylinder in the opening 122, the outer cylinder 119 has a plate 123 that is fixed to the cylinder and seats upon the upper face of the floor 13, as best shown in FIG. 4. The outer cylinder is secured in position by fastening devices 124 that extend through openings in the floor and registering openings in the plate. The cylinder is further retained by a snap ring 125 that seats in an annular groove 126 of the cylinder and engages the under face of the floor when secured thereto by a clamping ring 127 which is retained by fastening devices 128, also best shown in FIG. 4.

The inner cylinder 120 is guided by the outer cylinder and in its lower position, when in retracted position, is supported on a shoulder 129 formed by an inturned flange 130 at the bottom of the outer cylinder. When in retracted position, the upper end of the inner cylinder 120 substantially registers with the upper end of the outer cylinder 119. The inner sleeve 121 is connected with a plate 131 attached to the lower end of the outer cylinder by fastening devices 132. The inner sleeve is shorter than the inner cylinder 120 in that it terminates in substantial registry with a stop shoulder 133 that is provided on the inner face of the inner cylinder to seat the thrust bearing 87. The inner cylinder 120 is sealed above the thrust bearing 87 by a grease retainer 134 that is also inset in the inner cylinder 120 to seat upon the outer race of the thrust bearing. Slidably contained within the inner sleeve 121 is an elongated piston 135 having its upper end 136 seating the end of the lower trunnion of the magazine. A pressure fluid is admitted to act upon the piston 135 through a connection 137 that is carried by the plate 131.

The upper trunnion 81 of the magazine is slidably and oscillatably journaled in a bearing sleeve 138 that is fixed rigidly to a part of the mast. The part of the mast may be a transverse plate 139 having its ends connected to a pair of side girths 10 and having its rear marginal edge connected with the flange of a transverse angle 140 that is attached to a transverse girth, as shown in FIGS. 1–A, 4 and 6. The bearing sleeve 138 is carried by a bracket plate 141 seating upon the upper face of the plate 139 and secured by fastening devices such as bolts 142. The mounting for the bearing sleeve 138 is at a sufficient distance above the upper pipe holding device 64 to allow the desired reciprocal movement of the magazine and to allow for projection of the upper or box ends 78' of the drill pipe sections (see FIGS. 2 and 3).

The oscillator 84, previously mentioned, is best illustrated in FIGS. 9 and 10. The oscillator includes an outer ring shaped casing part 143 which provides therein a pressure chamber 144. The upper and lower ends of the pressure chamber are closed by heads 145 and 146 (FIGS. 4 and 10) having axial sleeves 147 and 148 for passing the portion 85 of the lower trunnion therethrough and to provide a fluid tight seal therearound. The parts of the casing are secured by fastening devices such as bolts 149.

Fixed to the trunnion portion 85 by a pin 150 and oscillatable in the pressure chamber 144 is the hub 151 of an oscillator in the form of a radially directed vane 152 (FIG. 9). The outer end of the vane 152 is slotted, as indicated, to carry a seal 153 having sealing contact with the faces of the pressure chamber 144. Cooperating with the vane is a partition 154 extending inwardly from the wall of the ring portion 143 of the casing and in sealing contact with the hub 151, to divide the pressure chamber into separate compartments 155 and 156. The casing has ports 157 and 158 in connection with the separate compartments 155 and 156, respectively, wherethrough fluid is admitted and exhausted from the compartments to act on one or the other sides of the vane in effecting oscillation of the magazine.

The casing 143 of the oscillator is fixed from rotation on the trunnion part 85 by means of a bracket 159 that is connected to the casing by certain of the fastening devices 149. The bracket 159 has a depending arm 160 containing a longitudinal groove or slot 161 in the rear face thereof to engage a stationary post 162, the post being suitably anchored to the floor 13 of the mast. With this arrangement the casing of the oscillator can move up and down with the magazine, but it is held in a rotary direction, so that the portion 154 provides the necessary abutment for the pressure fluid to turn the vane 152 and thereby turn the magazine.

The pressure fluid system for operating the magazine is shown diagrammatically in FIG. 12. The ports 157 and 158 are connected by flexible ducts 163 and 164 to ports 165 and 166 of a four-way valve 167. The valve 167 also has an inlet port 168 for pressure fluid and an outlet port 169 that is connected by a duct 170 with a tank 171. Fluid is drawn from the tank 171 by a pump 172 and supplied under pressure to the inlet port 168 of the valve 167 through a duct 173. Fluid is also supplied from the pump 172 to pressure fluid connection 137 of the elevator 118 through a branch duct 174, in which is connected a control valve 175 for supplying fluid under pressure to the elevator and for exhausting pressure fluid from the elevator through a discharge duct 176 leading back to the tank 171.

Assuming that the rig is constructed and assembled as described, with the magazine of the present invention rotatably mounted in the mast thereof as illustrated and described, the magazine is filled with drill pipe sections 49 as now to be described.

All of the arms 90 and 93 and bell crank levers 101 to 104 are lifted by grasping the curved ends 111 of the long arms 106 of the bell crank levers and swinging them upwardly and over the cross pins 107. This action moves the links 112 downwardly alongside the shaft 63 of the magazine and the short arm portions 99 of the upper arms downwardly on the pins 94, to raise the outer portions 100 and 106 of the arms from across the spaces above and below the arcuate slots 69 and 70 in the respective pipe holding devices 64 and 65. The first drill pipe section, on entering the mouths of the slots 69, is moved to seat against the curved ends 73 of the slots, after which the arm portion 100 of the arm 90 and the long arm portions 106 of the bell cranks 102 and 104 are moved across the outer face side of the drill pipe section. The next drill pipe section is passed through the open mouths of the slots 70 to seat against the ends 73 of the slots 70, after which the arm 92 and the long arm 106 of the bell crank lever 103 is moved across the outer face of that drill pipe section. A third drill pipe section is passed through the open mouths of the slots 69 until it seats against the arm portions 100 of the arm 90 and arm portion 106 of the bell crank 101. A fourth drill pipe section is similarly applied through the opposite slots 70, to seat against the arm portion 100 of the arm 92 and the arm portion 106 of the bell crank 103. The magazine is now filled, and the arm portions 100 of the upper arms 91 and 93 and the arm portions 106 of the bell crank 102 and 104 are moved across the drill pipe sections to lock the drill pipe sections in the holders.

The drill pipe sections for filling the magazine may be lifted from the ground to a position where they will enter the slots 69 and 70 by means of a hoisting line having a hoisting plug (not shown) attached thereto. The hoisting plug is threaded into the box 78' of the first drill pipe section to hoist it into the mast, so that the upper end thereof will enter one of the slots 69 or 70 of the upper holding device 64 and the shoulder 77 will be located in plane with the faces 75 and 76 at the sides of the lower slots 69 or 70 of the lower holding device 65. The shoulders 77 will thus slide along the faces 75 and 76 to support the drill pipe section, and the upper end of the pipe section will be guided in the slot of the upper holding device by contact of the sides of the pipe with the edges 71 and 72. The pin 78 on the drill pipe section will be depending below the disk portion 66 of the lower holding device 65.

After filling the magazine and preparatory to start of drilling, an additional drill pipe section 57, which is to be the first drill pipe section in the drilling string, is hoisted into the mast, where the box 58 thereof may be threaded to the pin 48 of the spud 47, after which the lower end or pin thereof is passed downwardly through the ratchet collar 31 and a drill bit attached to the pin thereof. Thus the spud 48 and drill pipe section 57 make up the initial drilling string.

If a slanting hole is desired, the mast is tilted rearwardly to the desired angle, as disclosed in the above mentioned application Serial No. 242,662. Since the magazine is oscillatably fixed within the mast, the magazine tilts therewith, so that the axis of the magazine remains parallel with the axis of the drilling string. The drill pipe sections are, therefore, cradled in the magazine.

Upon starting rotation of the drive rod 59 and applying downward pressure on the initial drilling string of drill pipe through the chains 26, a hole is drilled into the earth formation in accordance with the slanted position of the mast. When the hole is drilled to the point where the notches 61 in the sides of the drill pipe section 57 reach the ratchet collar 31, drilling is stopped, the drilling string lifted slightly, the fork 30 slid into the notches 61, and the drilling string is lowered to seat the arms of the fork on the ratchet collar. Then upon reverse rotation of the spud 47, the pin 48 thereon unscrews from the threads of the box 58. As soon as the threads of the pin 48 are free of the threads on the box 58, the first section of drill pipe 57, with the fork thereon, drops to the bottom of the slots 42 and 43, whereupon the arms of the fork suspend the drill pipe section 57 from the ratchet collar, which, in turn, is supported by the floor of the mast.

The spud 47, after being disconnected (FIG. 1), is hoisted above the drill pipe sections in the magazine. The magazine is moved to bring one of the drill pipe sections carried therein from the position shown in FIG. 1 to the position shown in FIG. 3, for connection into the drilling string. Since the lower holding device 65, in normal position of the magazine, is at about the level of the upper end of the drill pipe section which is supported by the fork 30, the magazine must be lifted to bring the lugs 51 on the drill pipe sections therein above the upper end of the drill pipe section supported by the fork. This is accomplished by manipulating the valve 175 (FIG. 12) to discharge pressure medium from the pump 172 through the ducts 173 and 174 into the lower end of the elevator 118, to effect elevation of the piston 135 and the magazine, since the upper end 136 of the piston is in contact with the trunnion 82 of the magazine. The inner guide cylinder 120, being attached to the portion 85 of the trunnion 82, is also lifted within the outer cylinder 119, thereby maintaining stability between the lower end of the trunnion and the outer cylinder of the elevator.

The magazine is now oscillated to bring, for example, the outermost pipe section in the slots 70 into coaxial relation with the drilling string. This is accomplished by rotation of the upper and lower trunnions of the magazine in the sleeve 138 and thrust bearing 87, respectively, upon manipulating the valve 167 to connect the ducts 173 and 163 to admit pressure medium into the compartment 155 of the oscillator. In this position of the valve, pressure medium is exhausted from the compartment 156 through the duct 164 and duct 170 back to the tank 171. The pressure medium acting on the vane 152 moves the magazine in a clockwise direction, as shown in FIG. 7, to carry the drill pipe section into coaxial relation with the drilling string.

As soon as the drill pipe section is coaxial with the drilling string (FIG. 3), the valve 167 is closed, and the valve 175 (FIG. 12) is manipulated to connect the duct 174 with the exhaust duct 176, whereupon the pressure medium in the elevator is discharged under the weight of the magazine, so that lowering of the magazine brings the lug 51 on that pipe section into the box 58 of the drill pipe section that is supported by the fork (FIG. 2). The elevator 118 is lowered until the inner cylinder 120 again comes into seating contact with the shoulder 129 of the outer cylinder 119. The shoulder 77 on the drill pipe section is then located slightly above the plane of the seats 75 and 76 of the lower holding device of the magazine, and the threads on the pin 78 seat upon the threads in the box of the drill pipe section carried by the fork 30. The traveling head 17 is now lowered to bring the pin 48 on the spud 47 into the box of the drill pipe section that has just been moved into position by the magazine.

It is obvious that the drill pipe section is now supported in the drilling string.

The handle 111 of the arm portion 106 of the bell crank lever 104 is lifted to retract the arm portion 106 of the bell crank lever 104 and the arm portion 100 of the latch arm 93, to clear contact with the drill pipe section and thereby free it, so that upon reversal of the magazine, the magazine moves out from the drill pipe section and is returned to its normal retracted position. This is accomplished by manipulating the valve 167 to reverse flow of pressure medium from the compartment 155 to the compartment 156, so that the pressure medium acts on the vane 152 in the opposite direction to turn the magazine in an anticlockwise direction to move the magazine to its original position.

The spud 47 is now rotated to screw the pin 48 thereof into the box of the drill pipe section and the pin 38 of the drill pipe section into the box 58. The drilling string is now intact and is first lifted to permit removal of the fork 30, after which the drilling string is lowered to bring the drill bit into contact with the bottom of the bore hole.

The drilling again proceeds until another drill pipe section must be added to the drilling string. This is accomplished in the same manner as adding the first drill pipe section. In order to keep the magazine balanced, this time the outermost drill pipe section in the slots 69 may be connected into the drilling string. Drill pipe sections are added as just described until the bore hole is drilled to the required depth.

When drilling is completed, the drilling string is removed from the bore hole. This is accomplished by lifting the drilling string to bring the uppermost drill pipe section thereof into position where it can be picked up by the magazine. The drilling string is lifted until the notches 61 in the next lower drill pipe section appear above the ratchet collar, whereupon the fork 30 is again applied in the notches 61 of that drill pipe section, and the drilling string is lowered until the arms of the fork seat upon the ratchet collar. The spud 47 is then rotated to unscrew the pin 48 and pin 78 of the uppermost drill pipe section, in the manner disclosed in the above mentioned application Serial No. 283,429.

When the threads of both pins are free, the drill pipe section is in the position shown in FIG. 2, so that the lower holding device 65 of the magazine is in position to engage under the shoulder 77 of the disconnected drill pipe section. The magazine is rotated in a direction to bring one or the other of the slots 69 or 70 into position so that the seats 75 and 76 engage under the shoulder 77. For example, if the magazine is to be picked up in the arcuate slots 70, the magazine will again be rotated in a clockwise direction until the magazine has moved sufficiently to bring the drill pipe section into the inner ends of the slots 70. The arm portions of the bell crank lever 103 and the arm portion 100 of the latch arm 92 will then be lowered over the outer face of the drill pipe section to latch it in the magazine. The traveling head 17 is now raised to elevate the spud 47 for clearance of the lug 51 thereon from the box of the drill pipe section. The magazine with the drill pipe section therein is now elevated by means of the elevator 118 to lift the drive lug on the lower end of the drill pipe section out of the box of the drill pipe section that is then carried on the fork 30. This is accomplished by manipulating the valve 175 to admit pressure medium into the elevator 118 to act upon the piston 135, as previously described.

The valve 167 will now be manipulated to supply pressure medium to the compartment 156 of the oscillator and exhaust pressure medium from the compartment 155 to effect turning of the magazine in an anticlockwise direction, to return the magazine to its original position so that it is out of the way of pulling the next drill pipe section. The next drill pipe section will then be disconnected and stored in the magazine with the same procedure as previously described. The operations will continue until all of the drill pipe sections except the drill pipe section 57 have been pulled from the bore hole and stored in the magazine. The drill pipe section carrying the drill bit (not shown) can then be handled within the mast through its connection with the spud 47. The mast is now free to be shifted or the rig moved to the drilling site of the next bore hole.

Attention is directed to the importance of the fact that the drill pipe sections are cradled in the magazine when the mast is tilted for drilling slanting holes, and since the magazine is rigidly but rotatably supported in the mast, the joint ends of the drill pipe sections are always in alignment with the bore hole when the magazine is axially rotated. Thus the drill pipe sections are more easily and rapidly handled without the usual problems in angle face drilling.

It is also apparent that elevating and lowering the magazine of the present invention eliminates separate hoisting and transfer mechanisms which are ordinarily required to lift an upper section from a lower section after the sections have been disconnected.

While the present invention is well adapted to handle the drill pipe of application Serial No. 283,429, it is also adapted for handling drill pipe equipped with any of the conventional tool joints where it is necessary to lift the pins out of the boxes.

The structure of the present mast, and the mounting of the pulldown mechanisms, together with elimination of breakout wrenches, provide ample space within the mast to accommodate the fixed oscillatory mounting of the magazine. Also, the magazine is so shaped that it handles the required number of pipe sections, yet when the magazine is returned to storage position within the mast, it does not interfere with the other drilling operations.

What we claim and desire to secure by Letters Patent is:

1. In a rotary drilling rig including a mast for handling a string of drill pipe composed of drill pipe sections connected in end to end relation by external threaded pins on the lower ends of each section connected with internally threaded boxes on the upper ends of said sections,
    a magazine for storing and handling the drill pipe sections in the mast when they are disconnected from said string of drill pipe and for carrying the drill pipe sections to and from axial registry with the string of drill pipe, said magazine having
    upper and lower heads provided with arcuate slots opening through the front edge of said heads,
    means within the mast for supporting the magazine for rotation on an axis within the mast with centers of the open ends of the slots arranged to intersect the axis of the drilling string,
    means for turning the magazine on said axis to a position with a drill pipe section in the drilling string passing into said slots to pickup and support the drill pipe section when being disconnected from the drilling string and for carrying the drill pipe section away from the drilling string to storage position and for returning the drill pipe section into axial registry with the string of drill pipe for reconnection to the drilling string, and
    means for raising and lowering the magazine for removing the pin of said section from the box of the next section in the drilling string in said first position and to lower the pin into the box in said other position of the magazine.

2. In a rotary drilling rig including a mast for handling a string of drill pipe composed of drill pipe sections connected together by joints having a pin on one section threaded into a box of the adjoining section,
    a magazine for storing and handling the drill pipe sections in the mast,
    means within the mast for supporting the magazine for rotational and reciprocal movement on a single fixed axis within the mast,
    means for turning the magazine on said axis to pick up a drill pipe section and carry the drill pipe section away from the drilling string, and
    means for reciprocating the magazine on said axis to lift the pin of said drill pipe section from the box of the next lower section in the string of drill pipe.

3. In a rotary drilling rig including a mast for handling a string of drill pipe composed of drill pipe sections connected together by joints having a pin on one section threaded into a box on the adjoining section,
    said pin being provided with an automatic breakout means depending within said box end of said adjoining section,
    a magazine for storing and handling the drill pipe sections in the mast,
    means within the mast for supporting the magazine for rotational and reciprocal movement on a single fixed axis within the mast,
    means for turning the magazine on said axis to pick up a drill pipe section and to carry the drill pipe section away from the drilling string, and
    means for reciprocating the magazine on said axis to lift the breakout means on the pin of said drill pipe section out of the box end of the next lower section in the string of drill pipe.

4. In a rotary drilling rig including a mast for handling a string of drill pipe composed of drill pipe sections connected in end to end relation by pin and box joints,
    a magazine for storing and handling the drill pipe sections in the mast and having horizontally arranged upper and lower holding devices provided with open end slots extending arcuately about a single fixed axis,
    means within the mast for supporting the magazine for oscillatory movement on said single fixed axis within the mast with said center of the open ends of the slots being in position to intersect the axis of the string of drill pipe,
    means for turning the magazine to receive in said slots the upper and lower ends of a drill pipe section after partial disconnection from the string of drill pipe, and
    means for raising and lowering the magazine on its axis of rotation to lift the pin out of the box for turning the magazine in the opposite direction when carrying said drill pipe section into storage position and for lowering the magazine after the turning means has turned the magazine to bring the drill pipe section back into aligning registry with the string of drill pipe.

5. In a rotary drilling rig including a mast for handling a string of drill pipe composed of drill pipe sections connected in end to end relation by pin and box joints,
    a magazine for storing and handling the drill pipe sections in the mast,
    means within the mast for supporting the magazine for oscillatory and reciprocal movement on a single fixed axis within the mast,
    means for oscillating the magazine to engage and remove a drill pipe section after disconnection from the drilling string for storage within the mast and for subsequently returning the drill pipe section from storage for connection into the drilling string, and
    means for reciprocating the magazine on said rotational axis for raising the magazine to lift the pin of the drill pipe section from a box when disconnecting the section for storage and for lowering the magazine to engage the pin in a box when connecting the drill pipe section in making up the drilling string.

6. In a rotary drilling rig including a mast for handling a string of drill pipe composed of drill pipe sections connected together by joints having a pin on one section threaded into a box of the adjoining section,
   a magazine for storing and handling the drill pipe sections in the mast, said magazine including
   a shaft extending parallel with the drilling string,
   upper and lower drill pipe holding devices each having an open front slot,
   means within the mast for supporting said shaft of the magazine for oscillatory and reciprocal movement on a single fixed axis within the mast,
   means for oscillating the magazine on said axis to bring the open ends of said slots into position to pick up a drill pipe section in said slots and to support the lower end of the drill pipe section on the lower holding device,
   latch means carried by the magazine for retaining the drill pipe section in the magazine, and
   means for reciprocating the magazine on said axis to lift the pin of said drill pipe section out of the box of the next lower section in the string of drill pipe.

7. In a rotary drilling rig including a mast for handling a string of drill pipe composed of drill pipe sections connected together by joints having a pin on one section threaded into a box of the adjoining section,
   a magazine for storing and handling the drill pipe sections in the mast as described in claim 5, wherein the means for oscillating the magazine includes
   a vane fixed to the shaft,
   a casing on the shaft enclosing the vane to provide pressure fluid compartments on opposite sides of the vane,
   means for preventing rotation of the casing during reciprocation of the magazine, and
   means for alternately admitting and exhausting a pressure medium to and from one and the other compartments for oscillating said magazine.

8. In a rotary drilling rig including a mast for handling a string of drill pipe composed of drill pipe sections connected together by joints having a pin on one section threaded into a box of the adjoining section,
   a magazine for storing and handling the drill pipe sections in the mast, said magazine including
   a shaft extending parallel with the drilling string,
   upper and lower drill pipe holding devices each having an open front slot spaced from said shaft,
   bearing means within the mast for supporting the upper end of the shaft of the magazine for oscillatory and reciprocal movement on a single fixed axis within the mast,
   elevating means carried by a part of the mast and having a thrust bearing cooperating with the first named bearing means for supporting the lower end of the shaft,
   means for oscillating the magazine on said axis to bring the open ends of said slots into position to pick up a drill pipe section in said slots and to support the lower end of the drill pipe section on the lower holding device,
   latch means carried by the magazine for retaining the drill pipe section in the magazine, and
   means for actuating the elevating means to lift the magazine for removing the pin of said drill pipe section from the box of the next lower section in the string of drill pipe.

9. In a rotary drilling rig including a mast for handling a string of drill pipe made up of drill pipe sections having externally threaded tapered pins on the lower ends and internally threaded tapered boxes on the upper ends,
   a magazine for storing the drill pipe sections and for carrying the drill pipe sections into position for connection into the drilling string, said magazine including
   a shaft extending parallel with the axis of the drilling string,
   upper and lower holding devices each having substantially semicircular disk portions respectively fixed near the upper and lower ends of the shaft and having arcuate slots opening from a transverse edge of said disk portions at opposite sides of the shaft,
   the upper arcuate slots having edges spaced apart in accordance with the outer diameter of the drill pipe sections and the lower arcuate slots being of a width to pass said pins and provide marginal seats on the upper face for seating shoulders of the drill pipe sections,
   latch means carried by the magazine and engageable between the drill pipe sections to retain the drill pipe sections within the magazine,
   means within the mast for supporting the shaft for oscillatory movement of the magazine on a single fixed axis within the mast, and
   means for oscillating the magazine to carry a drill pipe section into registry with the box on the uppermost drill pipe section of the drilling string and for withdrawing the magazine from the drill pipe section after release thereof by said latches.

10. In a rotary drilling rig including a mast for handling a string of drill pipe made up of drill pipe sections having externally threaded tapered pins on the lower ends and internally threaded tapered boxes on the upper ends,
    a magazine for storing the drill pipe sections and for carrying the drill pipe sections into position for connection into the drilling string, said magazine including
    a shaft extending parallel with the axis of the drilling string,
    upper and lower holding devices each having substantially semicircular disk portions respectively fixed near the upper and lower ends of the shaft and having arcuate slots opening from a transverse edge of said disk portions at opposite sides of the shaft,
    the upper arcuate slots having edges spaced apart in accordance with the outer diameter of the drill pipe sections and the lower arcuate slots being of a width to pass said pins and provide marginal seats on the upper face for seating shoulders of the drill pipe sections,
    latch means carried by the magazine and engageable between the drill pipe sections to retain the drill pipe sections within the magazine,
    means within the mast for supporting the shaft for oscillatory movement of the magazine on a single fixed axis within the mast,
    means for oscillating the magazine to carry a drill pipe section into registry with the box on the uppermost drill pipe section of the drilling string and for withdrawing the magazine from the drill pipe section after release thereof by said latches, and
    means for reciprocating the magazine on said axis to lower the pin on said drill pipe section into the box of the upper drill pipe section of the drilling string prior to withdrawal of the magazine.

11. In a rotary drilling rig including a mast for handling a string of drill pipe composed of drill pipe sections connected in end to end relation,
    a magazine for storing and handling the drill pipe sections in the mast and having an axial shaft,
    a bearing sleeve fixed within the mast for slidably and oscillatably mounting the upper end of said shaft,
    an elevator fixed in axial alignment with said bearing sleeve at the lower end of the mast and having an outer cylinder,
    a thrust bearing carried on the lower end of the shaft,
    an inner cylinder carried by the thrust bearing and having guided support within the outer cylinder to cooperate with said bearing sleeve, a sleeve within the inner cylinder and fixed to the lower end of the outer cylinder, a piston reciprocable in the last named sleeve and providing bearing support for the lower end of the shaft, and means for admitting pressure medium into the inner sleeve to act on the piston for raising the magazine to lift the drill pipe section carried by the magazine for clearing the uppermost drill pipe section in the drilling string.

12. In a rotary drilling rig including a mast for handling a string of drill pipe composed of drill pipe sections connected in end to end relation, a magazine for storing and handling the drill pipe sections in the mast and having an axial shaft, a bearing sleeve fixed within the mast for reciprocably and oscillatably mounting the upper end of said shaft, an elevator fixed in axial alignment with said bearing sleeve at the lower end of the mast and having an outer cylinder, a thrust bearing carried on the lower end of the shaft, an inner cylinder carried by the thrust bearing and having guided support within the outer cylinder to cooperate with said bearing sleeve, a sleeve within the inner cylinder and fixed to the lower end of the outer cylinder, a piston reciprocable in the inner sleeve and providing bearing support for the lower end of the shaft, a vane fixed to the lower end of the shaft, a casing enclosing the vane and providing pressure medium compartments at the respective sides of the vane, a guide fixed to the lower portion of the mast and having sliding connection with said casing for holding the casing from rotation, means for admitting pressure medium into the inner sleeve to act on the piston for raising the magazine to lift the drill pipe section carried by the magazine for clearing the uppermost drill pipe section of the drilling string, and means for admitting pressure medium into one compartment of said casing and exhausting pressure medium from the opposite compartment of the casing for oscillating the magazine.

13. In a rotary drilling rig including a mast for handling a string of drill pipe composed of drill pipe sections, a magazine for storing and handling the drill pipe sections, said magazine including a vertical shaft, upper and lower pipe holding devices fixed to the shaft near upper and lower ends of the shaft, means journaling the ends of the shaft for oscillation of the magazine on a single axis, a vane fixed to the shaft, a casing enclosing the vane and cooperating therewith in providing pressure medium compartments at the respective sides of the vane, and means for alternately admitting pressure medium into and out of said compartments of said casing for oscillating the magazine.

14. In a rotary drilling rig including a mast for handling a string of drill pipe made up of drill pipe sections having externally threaded tapered pins on the lower ends of said sections, a magazine for storing the drill pipe sections and for carrying the drilling pipe sections into position for connection and disconnection with the drilling string, said magazine including a shaft extending parallel with the axis of the drilling string, and upper and lower holding devices each having substantially semicircular disk portions respectively fixed near the upper and lower ends of the shaft and having arcuate slots opening from a transverse edge of said disk portions at opposite sides of the shaft, the arcuate slots of the upper holding device having edges spaced apart in accordance with the outer diameter of the drill pipe sections and the slots of the lower holding device being of a width to pass said pins and provide marginal seats on the upper face for seating shoulders of the drill pipe sections.

15. In a rotary drilling rig including a mast for handling a string of drill pipe composed of drill pipe sections, an oscillatory magazine for storing and handling the drill pipe sections in the mast, said magazine including a shaft, means rotatably journaling ends of the shaft for oscillation of the magazine in the mast on a fixed axis, drill pipe holding devices fixed to upper and lower portions of the shaft, said holding devices being of substantially semicircular shape providing a transverse front edge and each having open front arcuate slots extending about said shaft on opposite sides thereof and opening through the transverse front edge to engage and store the drill pipe sections therein, and means for oscillating said magazine on the axis of the shaft to bring the open ends of the slots alternately into position for picking up drill pipe sections in said slots and to position the front transverse edge out of the way of raising and lowering the string of drill pipe in the mast, the arcuate slots of one holding device having upper marginal seats at edges of the slots for seating shoulders of the drill pipe sections thereon to support the drill pipe sections with lower end portions depending below the lower of said holding devices.

References Cited by the Examiner

UNITED STATES PATENTS

| | | | |
|---|---|---|---|
| 2,909,288 | 10/1959 | Boudette | 175—85 X |
| 3,025,918 | 3/1962 | Leven | 175—85 |
| 3,157,286 | 11/1964 | Gyongyosi | 211—60 |
| 3,181,630 | 4/1965 | Coburn | 175—85 |
| 3,185,310 | 4/1965 | Klem | 175—85 |

CHARLES E. O'CONNELL, *Primary Examiner.*

J. A. LEPPINK, *Assistant Examiner.*